US 8,806,872 B2

(12) United States Patent
Pieussergues et al.

(10) Patent No.: US 8,806,872 B2
(45) Date of Patent: Aug. 19, 2014

(54) PROCEDURE FOR IGNITING A TURBINE ENGINE COMBUSTION CHAMBER

(75) Inventors: Christophe Pieussergues, Nangis (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/808,211

(22) PCT Filed: Jul. 1, 2011

(86) PCT No.: PCT/FR2011/051555
§ 371 (c)(1),
(2), (4) Date: Jan. 3, 2013

(87) PCT Pub. No.: WO2012/004496
PCT Pub. Date: Jan. 12, 2012

(65) Prior Publication Data
US 2013/0118181 A1    May 16, 2013

(30) Foreign Application Priority Data
Jul. 7, 2010   (FR) ...................................... 10 55533

(51) Int. Cl.
| F02C 7/26 | (2006.01) |
| F02C 7/264 | (2006.01) |
| F23R 3/28 | (2006.01) |
| F23N 1/00 | (2006.01) |
| F02C 7/266 | (2006.01) |
| F02C 9/28 | (2006.01) |

(52) U.S. Cl.
CPC . *F02C 7/264* (2013.01); *F23R 3/28* (2013.01); *F23N 1/002* (2013.01); *F02C 7/266* (2013.01); *F02C 9/28* (2013.01); *F23N 2027/02* (2013.01)
USPC ................................................ 60/772; 60/786

(58) Field of Classification Search
CPC ............ F01K 13/02; F02C 7/26; F02C 7/262; F23R 3/28
USPC ........................ 60/772, 776, 39.281, 786–788
See application file for complete search history.

(56) References Cited

U.S. PATENT DOCUMENTS 3,667,218 A * 6/1972 Davis .......................... 60/39.281
5,121,596 A * 6/1992 Takehara et al. ................. 60/775
(Continued)

FOREIGN PATENT DOCUMENTS

DE         103 58 394         7/2005
DE    10 2008 022 084       11/2009
(Continued)

OTHER PUBLICATIONS

International Search Report Issued Jan. 19, 2012 in PCT/FR11/51555 Filed Jul. 1, 2011.

*Primary Examiner* — Phutthiwat Wongwian
(74) *Attorney, Agent, or Firm* — Oblon, Spivak, McClelland, Maier & Neustadt, L.L.P.

(57) ABSTRACT

A procedure for igniting a combustion chamber of a turbine engine, the chamber being fed with fuel by injectors and including an igniter mechanism igniting the fuel injected into the chamber. The procedure includes an initial stage during which fuel is injected into the chamber at a constant rate while simultaneously exciting the igniter mechanism, and in event of non-ignition of the chamber at an end of the initial stage, a second stage during which a rate at which fuel is injected is increased rapidly by 20% to 30%.

14 Claims, 2 Drawing Sheets

(56) References Cited

U.S. PATENT DOCUMENTS

| | | | |
|---|---|---|---|
| 5,129,221 A * | 7/1992 | Walker et al. | 60/778 |
| 5,907,949 A * | 6/1999 | Falke et al. | 60/779 |
| 2003/0056522 A1* | 3/2003 | Hartzheim | 60/779 |
| 2004/0237535 A1* | 12/2004 | Ainsworth | 60/772 |
| 2004/0237538 A1 | 12/2004 | McKelvey et al. | |
| 2006/0037326 A1* | 2/2006 | Mehrer et al. | 60/776 |

FOREIGN PATENT DOCUMENTS

| | | |
|---|---|---|
| EP | 1 672 280 | 6/2006 |
| JP | 2003 328777 | 11/2003 |
| JP | 2010 65579 | 3/2010 |
| WO | 98 25082 | 6/1998 |
| WO | 03 018977 | 3/2003 |

\* cited by examiner

PROCEDURE FOR IGNITING A TURBINE ENGINE COMBUSTION CHAMBER

BACKGROUND OF THE INVENTION

1. Field of the Invention

The present invention relates to a procedure for igniting a combustion chamber, and also to a turbine engine in which the procedure is implemented.

2. Description of the Related Art

In known manner, in a turbine engine, an annular combustion chamber is fed with air by a high-pressure compressor and with fuel by injectors having heads that extend through orifices in an annular chamber end wall, the injectors being regularly distributed around the axis of the chamber. Igniter means, such as spark plugs are fitted downstream from the injectors in orifices through annular walls of the chamber and leading to the inside of the chamber.

On the ground, prior to injecting fuel into the combustion chamber, a starter is put into operation and it drives the rotor of the high-pressure compressor so as to cause air under pressure to enter into the combustion chamber. As from a given speed, i.e. from some given number of revolutions per minute (rpm) for the rotor of the high-pressure compressor, fuel is injected into the chamber at a constant flow rate while simultaneously exciting the igniter means. The fuel is mixed with the air under pressure that enters into the chamber and it is ignited by sparks generated by the spark plugs.

In order to facilitate ignition, it is known to mount some injectors having a greater flow rate than the other injectors in axial alignment with the spark plugs so as to have greater richness of fuel in the vicinity of the spark plugs, thereby guaranteeing that the chamber will ignite rapidly.

Although that configuration ensures that fuel is reliably ignited in the combustion chamber, it is nevertheless found to be more complicated to implement than a configuration in which all of the injectors are identical, since the higher flow rate injectors require their opening valves to be adjusted in a manner that is different from the other injectors. Furthermore, in order to avoid installing a lower flow rate injector in a location that is supposed to receive a greater flow rate injector, it is necessary to provide keying means, thereby complicating fabrication of the chamber. Costs are also increased since, in terms both of fabrication and of maintenance, it is necessary to have injectors of types that present different characteristics.

BRIEF SUMMARY OF THE INVENTION

A particular object of the invention is to provide a solution to this problem that is simple, effective, and inexpensive, while avoiding the above-mentioned drawbacks.

To this end, the invention provides a procedure for igniting a combustion chamber of a turbine engine, the chamber being fed with fuel by injectors and having igniter means for igniting the fuel injected into the chamber, the procedure being characterized in that it comprises an initial stage during which fuel is injected into the chamber at a constant rate while simultaneously exciting the igniter means, and in the event of non-ignition of the chamber at the end of the initial stage, it comprises a second stage during which the rate at which fuel is injected is increased rapidly by 20% to 30%, the second stage being followed by a stage of progressively increasing the fuel flow rate by an amount that is smaller and slower than in the second stage.

Unlike the prior art in which the fuel flow rate is kept constant from the beginning of excitation of the igniter means and until the combustion chamber ignites, the ignition procedure of the present invention consists in an initial stage at constant flow rate that is followed, in the event of non-ignition, by a stage during which the fuel rate is increased rapidly by 20% to 30% so as to increase very significantly the richness of fuel inside the chamber (where richness corresponds to the ratio between the rate at which fuel is injected into the chamber and the rate at which air is fed into the combustion chamber).

In the event of non-ignition persisting, progressively increasing the fuel rate makes it possible to continue to increase the fuel richness inside the chamber. This second increase is smaller and not as fast as the first increase so as to ensure that when the chamber does ignite large flames are not formed that might impact the turbine downstream from the combustion chamber.

This increase in richness makes it easier to ignite the chamber, since the ignition margin is increased compared with maintaining the flow rate at a constant value.

According to another characteristic of the invention, the rapid increase in the fuel flow rate is performed over a short time of about 1 second (s) to 2 s so as to increase the richness of the air/fuel mixture in the chamber very quickly and rapidly facilitate ignition in the chamber.

Advantageously, the progressive increase in fuel flow rate lasts for about 10 s to 15 s.

At the end of this progressive increase, the fuel flow rate from the injectors is greater than about 50% to 80% of the constant flow rate during the initial stage.

According to another characteristic of the invention, when, during the above-mentioned progressive increase, the fuel flow rate has increased up to a maximum value lying in the range 1.5 times to 1.8 times the flow rate of the initial stage, the fuel flow rate is stabilized at this maximum value until the end of the ignition procedure.

According to another characteristic of the invention, the speed of rotation of the engine increases progressively during the two above-specified stages.

The procedure of the invention is advantageously implemented with injectors that are identical and fed with fuel in the same manner during the two above-specified stages.

BRIEF DESCRIPTION OF THE SEVERAL VIEWS OF THE DRAWINGS

Other advantages and characteristics of the invention appear on reading the following description made by way of non-limiting example and with reference to the accompanying drawings, in which.

DETAILED DESCRIPTION OF THE INVENTION

Figure 1:
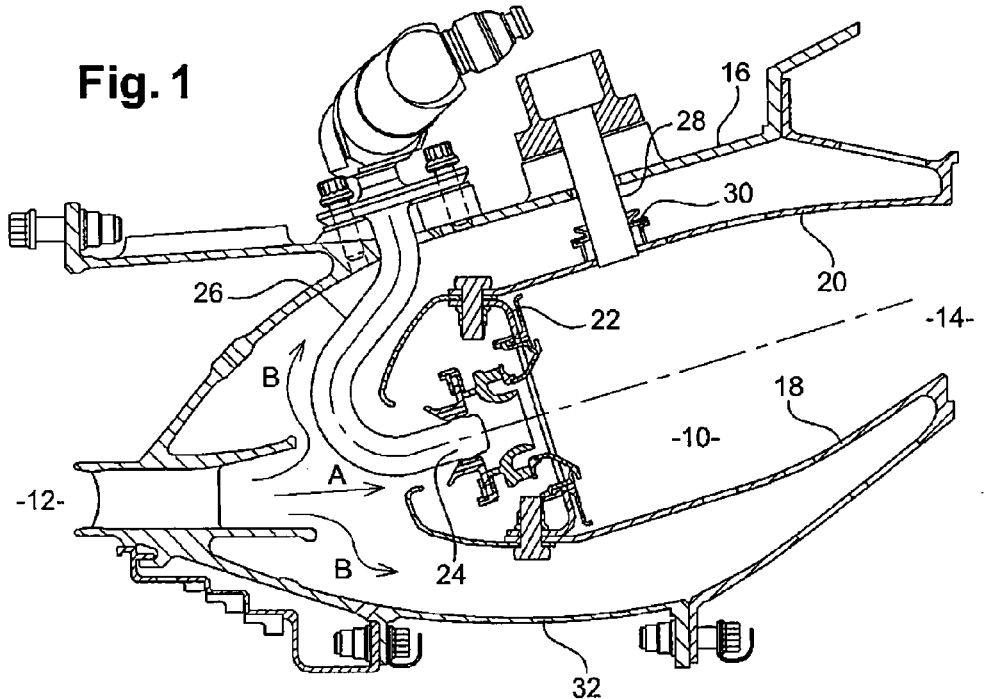
FIG. 1 is a diagrammatic half-view in axial section of a turbine engine combustion chamber of known type.

Reference is made initially to FIG. 1 which shows an annular combustion chamber 10 of a turbine engine such as an airplane turboprop or turbojet, the combustion chamber being arranged between an upstream high-pressure compressor 12 and a downstream high-pressure turbine 14.

The combustion chamber 10 is mounted inside an outer casing 16 and has inner and outer walls 18 and 20 forming surfaces of revolution, which walls are connected at their upstream ends to an annular chamber end wall 22 having orifices for passing injector heads 24 that are fed with fuel by fuel feed ducts 26.

At least one ignition spark plug 28 is carried by the outer casing 16 and is engaged in guide means 30 carried by the outer wall 20. The inner end of the spark plug 28 opens into the chamber 10 in order to ignite the fuel injected therein.

On the ground, the turbine engine is ignited by an electric starter whose outlet shaft is connected by a gear train to the shaft of the high-pressure compressor. Running the starter causes the shaft of the high-pressure compressor to rotate, thereby causing air under pressure to penetrate into the chamber, which air splits into a stream of air entering the inside of the combustion chamber where it is mixed with fuel (arrow A) and a bypass stream of air that flows around the combustion chamber (arrows B). The bypass stream of air flows between the inner casing 32 and the inner wall 18 and also between the outer casing 16 and the outer wall 20.

Exciting the spark plug 28 serves to ignite the fuel injected into the chamber 10 and mixed with air leaving the high-pressure compressor 12.

Figure 2:
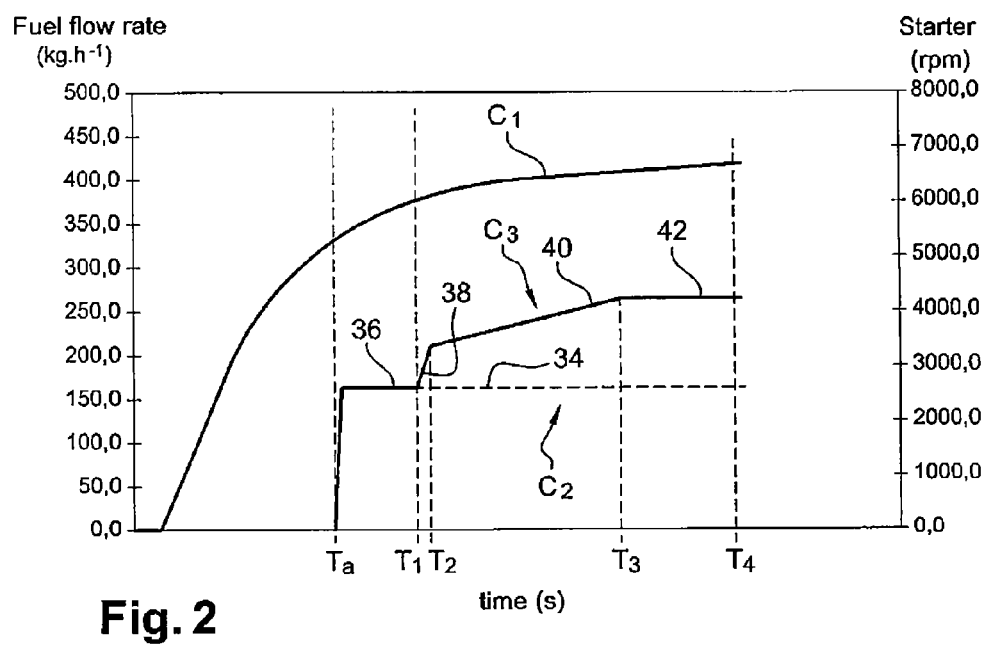
FIG. 2 is a graph plotting three curves, two of which represent the variation in fuel flow rate as a function of time using the ignition procedures of the prior art and of the invention, with the third curve showing the variation in the speed of the starter as a function of time.

FIG. 2 is a graph having three curves, the first of which, curve $C_1$, plots variation in the speed of rotation of the starter up the ordinate axis in revolutions per minute (scale on the right of the graph) as a function of time plotted along the abscissa axis. The other two curves show variation in the rate in kilograms per hour (kg/h) at which fuel is injected into the chamber up the ordinate axis (scale on the left of the graph) as a function of time plotted along the abscissa axis, one of these curves $C_2$ corresponding to the ignition procedure of the prior art and the other curve $C_3$ to the ignition procedure of the invention.

In the prior art, when the speed of the starter reaches about 5000 rpm to 5500 rpm, fuel is injected into the chamber at a constant flow rate 34 of about 150 kg/h while simultaneously exciting the spark plugs at an instant $T_a$.

This flow rate is kept constant until an instant $T_4$ that corresponds to the end of the ignition procedure, at which the injectors 26 are no longer fed if ignition has not taken place, with the time interval $T_4$-$T_a$ being about 25 s for example.

In order to guarantee reliable ignition of the combustion chamber, those injectors that are in axial alignment with the spark plugs 28 deliver fuel at a rate that is constant and that is about 20% greater than the flow rate of fuel delivered by the other injectors. In this way, the richness of the fuel—i.e. the ratio between the fuel flow rate and the flow rate of air entering into the combustion chamber—is locally increased in the vicinity of the spark plugs, thereby making it easier to ignite the combustion chamber.

The invention provides a solution to the problems associated with using injectors of different types, by proposing an ignition procedure that is reliable and that operates with injectors that are identical, and that are fed in the same manner in terms of flow rate and pressure.

This ignition procedure (curve $C_3$) comprises an initial stage 36 of feeding the injectors at a constant rate, while simultaneously exciting the spark plugs between instants $T_a$ and $T_1$, this stage having a duration of the order of 5 s to 8 s.

If there is no ignition in the combustion chamber during this initial stage 36, the fuel flow rate from all of the injectors is modified simultaneously so that the fuel flow rate in the chamber increases rapidly by 20% to 30% between instants $T_1$ and $T_2$, with this stage 38 having a duration of the order of about 1 s to 2 s.

This very fast increase in fuel flow rate makes it possible to increase very quickly the richness in the chamber, thereby making it easier to ignite the chamber 10.

At the end of this second stage 38, and in the event of the combustion chamber 10 not igniting, the fuel flow rate is increased progressively during a subsequent stage 40 between instants $T_2$ and $T_3$ so as to reach a flow rate that is 50% to 80% greater than the flow rate of the initial stage 36 at the end of this stage 40 of progressive increase. This stage 40 of progressive increase lasts for about 10 s to 15 s. In the event of non-ignition, the flow rate is kept constant during a stage 42 that extends from times $T_3$ to $T_4$ and that lasts for about 8 s to 10 s.

If ignition has not occurred at time $T_4$, then fuel injection and spark plug excitation are stopped and a known procedure is executed prior to beginning the ignition procedure once more.

The invention thus makes it possible to achieve reliable ignition of the combustion chamber without having recourse to increased flow rate injectors as in the prior art. All of the injectors are identical and all of them operate identically in terms of flow rate and pressure, thereby reducing costs and facilitating assembly and also maintenance operations.

Figure 3:
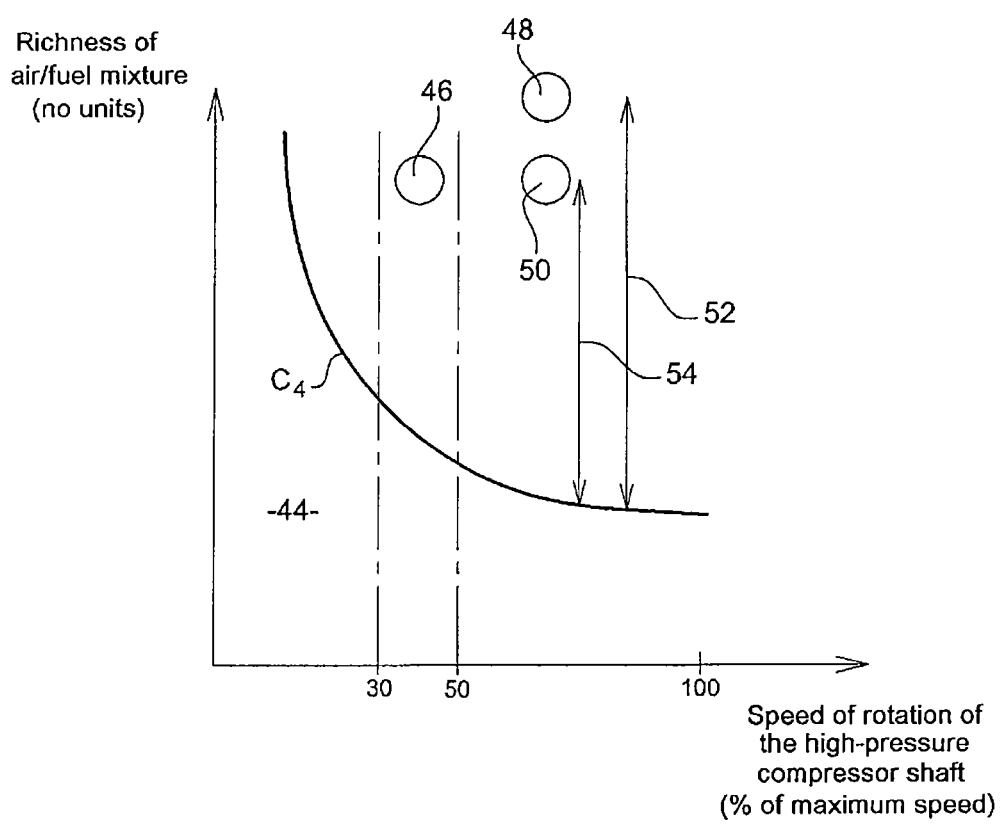
FIG. 3 is a graph showing variation in the fuel richness as a function of the speed of rotation of the high-pressure compressor.

FIG. 3 shows a curve $C_4$ plotting variation in the richness of the air/fuel mixture in the combustion chamber as a function of the speed of rotation of the rotor of the high-pressure compressor expressed as a percentage of its maximum speed. The curve $C_4$ corresponds to the ignition limit for the chamber. Thus, in the zone 44 situated beneath the curve $C_4$, the richness is too low to enable the combustion chamber to be ignited.

The instant $T_a$ at the beginning of the ignition stage in FIG. 2 corresponds to a speed of rotation lying in the range about 30% to 50% of the maximum speed of rotation of the rotor of the high-pressure compressor. This instant $T_a$ is represented by a point 46 on the graph of FIG. 3. The ignition procedure of the invention by increasing richness after the initial stage in the event of non-ignition makes it possible to shift the ignition point to a point 48 that lies above a point 50 corresponding to keeping the richness constant as in the prior art. In this way, the margin 52 of the point 48 relative to the ignition limit is greater than the margin 54 of the point 50.

The invention claimed is:

1. A method for igniting a combustion chamber of a turbine engine, the method comprising:
   a first initial stage during which fuel is injected into the combustion chamber at a constant rate while simultaneously exciting an igniter which ignites the fuel injected into the combustion chamber;
   a second stage during which a rate at which fuel is injected is increased rapidly by 20% to 30%; and
   the second stage being followed by a third stage of progressively increasing the fuel flow rate by an amount that is smaller and slower than in the second stage.

2. A method according to claim 1, wherein the first initial stage has a duration of about 5 to 8 seconds, and the second stage corresponds to an increase in the fuel flow rate that takes place over a time of about 1 to 2 seconds.

3. A method according to claim 1, wherein the third stage corresponds to an increase in the fuel flow rate that lasts for about 10 to 15 seconds.

4. A method according to claim 3, wherein the fuel flow rate from the injectors at an end of third stage is greater than about 50% to 80% of the constant flow rate during the first initial stage.

5. A method according to claim 1, wherein a speed of rotation of the turbine engine increases progressively during the three stages.

6. A method according to claim 1, wherein all of the injectors are identical and fed with fuel in a same manner during the three stages.

7. A method according to claim 4, wherein the fuel flow rate is increased up to a maximum value in a range 1.5 times to 1.8 times the fuel flow rate of the initial stage, and the fuel flow rate is then stabilized at this maximum value until an end of the ignition procedure.

8. A method according to claim 1, wherein the combustion chamber is fed with fuel by injectors.

9. A method for igniting, at a ground level, a combustion chamber of a turbine engine including a compressor, the method comprising:
   a first stage during which running an electric starter connected to a shaft of the compressor causes the shaft to rotate, thereby causing air under pressure to penetrate into the chamber, while injecting fuel into the combustion chamber at a constant non-zero rate and simultaneously exciting an igniter trying to ignite the fuel injected into the combustion chamber; then
   further to an event of non-ignition of the fuel in the combustion chamber at an end of said first stage, a second stage during which a rate at which fuel is injected is increased rapidly by 20% to 30% with respect to said constant non-zero rate, while exciting the igniter which ignites the fuel injected into the combustion chamber.

10. A method according to claim 9, wherein the second stage is followed by a third stage of progressively increasing the rate at which fuel is injected, by an amount that is smaller and slower than the fuel flow rate in the second stage.

11. A method according to claim 9, wherein, during the first stage, the electric starter is running at a substantially constant speed of rotation.

12. A method according to claim 9, wherein, during the second stage, the electric starter is running at a speed of rotation which is higher than a speed of rotation of the electric starter at the end of the first stage.

13. A method according to claim 9, wherein, during the second stage, the electric starter is running at a speed of rotation which increases.

14. A method according to claim 10, wherein, during the third stage, the electric starter is running at a speed of rotation which increases lower than a speed of rotation of the electric starter increases during the second stage.

* * * * *